US012721298B2

(12) United States Patent
Bertilsson

(10) Patent No.: US 12,721,298 B2
(45) Date of Patent: Sep. 1, 2026

(54) MILKING SYSTEM

(71) Applicant: DELAVAL HOLDING AB, Tumba (SE)

(72) Inventor: Anders Bertilsson, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 18/847,067

(22) PCT Filed: Mar. 16, 2023

(86) PCT No.: PCT/SE2023/050231
§ 371 (c)(1),
(2) Date: Sep. 13, 2024

(87) PCT Pub. No.: WO2023/177344
PCT Pub. Date: Sep. 21, 2023

(65) Prior Publication Data

US 2025/0212831 A1 Jul. 3, 2025

(30) Foreign Application Priority Data

Mar. 16, 2022 (SE) .................................... 2250326-2

(51) Int. Cl.
*A01J 5/007* (2006.01)
*A01J 5/04* (2006.01)

(52) U.S. Cl.
CPC ............... *A01J 5/007* (2013.01); *A01J 5/048* (2013.01)

(58) Field of Classification Search
CPC .... A01J 5/007; A01J 5/048; A01J 5/01; A01J 5/047; A01J 7/005
See application file for complete search history.

(56) References Cited

U.S. PATENT DOCUMENTS 4,011,838 A * 3/1977 Nordegren .............. A01J 5/007 119/14.08
6,152,076 A 11/2000 Laub-maier
(Continued)

FOREIGN PATENT DOCUMENTS

EP 0222574 A2 5/1987
EP 0784924 A1 7/1997
(Continued)

OTHER PUBLICATIONS

Search Report for SE Application No. 2250326-2 dated Sep. 29, 2022, 3 pages.
(Continued)

*Primary Examiner* — Magdalena Topolski
*Assistant Examiner* — Spencer T Callaway
(74) *Attorney, Agent, or Firm* — NIXON & VANDERHYE

(57) ABSTRACT

A milking system includes: a plurality of teat cups; a plurality of milk evacuation tubes, each one connected to a respective teat cup; a vacuum pump arrangement; a receiver, connected to the vacuum pump arrangement via a pipe, and also connected to each one of the teat cups via the respective connected milk evacuation tube, wherein an under-pressure in relation to atmospheric pressure prevails in the receiver during the milking session; and a vacuum regulator for setting the under-pressure prevailing in the receiver to a first level of under-pressure at a commencement of the milking session; and increase the under-pressure during the milking session to a second level of under-pressure.

14 Claims, 8 Drawing Sheets

(56) References Cited

U.S. PATENT DOCUMENTS

| | | | | |
|---|---|---|---|---|
| 10,492,460 | B1 * | 12/2019 | Gehm | A01J 5/007 |
| 2008/0127896 | A1 | 6/2008 | Petterson et al. | |
| 2011/0239942 | A1 * | 10/2011 | Arkadi | A01J 5/0075 119/14.02 |
| 2012/0160174 | A1 | 6/2012 | Gudmundsson | |
| 2014/0174366 | A1 * | 6/2014 | Wilson | A01J 5/007 119/14.08 |
| 2014/0373787 | A1 | 12/2014 | Petterson | |
| 2015/0296736 | A1 * | 10/2015 | Cattaneo | A01J 5/007 119/14.08 |
| 2016/0135424 | A1 * | 5/2016 | Bosma | A01K 1/12 119/14.02 |
| 2017/0295743 | A1 * | 10/2017 | Brown | A01J 5/0133 |

FOREIGN PATENT DOCUMENTS

| | | | | |
|---|---|---|---|---|
| EP | 3620046 | A1 | 3/2020 | |
| WO | WO-0035271 | A1 * | 6/2000 | B65D 81/245 |
| WO | 0119169 | A1 | 3/2001 | |
| WO | 2009093966 | A2 | 7/2009 | |

OTHER PUBLICATIONS

International Search Report for PCT/SE2023/050231 dated May 30, 2023, 3 pages.

Written Opinion of the ISA for PCT/SE2023/050231 dated May 30, 2023, 5 pages.

* cited by examiner

MILKING SYSTEM

CROSS-REFERENCE TO RELATED APPLICATIONS

This application is the US national stage of PCT/SE2023/050231, filed Mar. 16, 2023 and designating the United States, which claims the priority of SE 2250326-2, filed Mar. 16, 2022. The entire contents of each foregoing application are incorporated herein by reference.

BACKGROUND OF THE INVENTION

Field of the Invention

The invention refers to a milking system.

Description of the Related Art

On a dairy farm, milk is typically extracted from the animals by attaching a teat cup with a liner on each teat of the animal and apply an under-pressure/milking vacuum under the tip of the teat, in addition to a pulsation vacuum. Hereby, the rhythmical suckling of a calf is imitated so that sucking by the milking vacuum is interrupted by rhythmical motions, opening and closing of the liner, caused by the pulsation vacuum.

It is sometimes desired to adapt the under-pressure supplied to the teat cups during a milking session such that the magnitude of the under-pressure varies with the current mass flow rate of the animal teats.

Initially, a first under-pressure level may be supplied to facilitate a smooth application of the teat cups to the teats and to stimulate the teats yet maintaining teat integrity by not supplying an excess under-pressure before milk flow of the teats has reached a mass flow rate exceeding a predefined mass flow rate limit. As the mass flow rate increases, a second under-pressure level (i.e. more under-pressure in relation to atmospheric pressure) may be supplied to the teat cups when the predefined mass flow rate limit is exceeded. By supplying the second under-pressure level, milk is extracted from the teats at a shorter time in relation to supplying a constant under-pressure at the first under-pressure level during the whole milking session, thereby increasing the number of animals per time unit that could be served by the milking equipment, for example a milking robot.

System vacuum of a vacuum pump arrangement may be supplied to a receiver where milk is collected, and the appropriate under-pressure level (either individually for each respective teat, or on teat cluster level) is then regulated by a respective valve. The valve may be arranged in a milk evacuation tube connecting each teat cup with the receiver. In case of low milk flow, the valves must be set to a very narrow passage, to maintain an appropriate under-pressure level at the respective teat.

However, in case the passage of the valve is very narrow, turbulence of the passing milk may affect milk quality.

SUMMARY OF THE INVENTION

It is an object of the present invention to evolve a milk extraction concept for enabling reduction of energy consumption while improving milk quality.

This object is achieved by a milking system as disclosed and claimed. The inventive milking system aims at setting the under-pressure prevailing in the receiver to the first level of under-pressure at the commencement of the milking session; and increase the under-pressure prevailing in the receiver during the milking session from the first level of under-pressure, to a second level of under-pressure.

Thereby, the under-pressure supplied to the teat cups is correspondingly increased when mass flow rate of the teats is high, leading to a time-efficient milk extraction, yet maintaining teat integrity. Thereby also the supplied under-pressure to the teat cups via the milk evacuation tubes, also called long milk hose tubes, is increased when the mass flow rate of the animal teats is high, i.e. exceeding a predefined threshold limit.

The milking system comprises various components, such as for example the plurality of teat cups, each configured to fit on the respective teat of the animal during milk extraction in the milking session, and the plurality of milk evacuation tubes, wherein each milk evacuation tube is connected to the respective teat cup. Each teat cup may comprise a respective liner and a shell, forming a pulsation space between the liner and the shell. The milking system also comprises a vacuum pump arrangement of one or several vacuum pumps. The vacuum pump arrangement is configured to generate a system vacuum pressure.

The milking system comprises the receiver, connected to the vacuum pump arrangement via a pipe, and also connected to each one of the teat cups via the respective connected milk evacuation tube. In the receiver, an under-pressure prevails in relation to atmospheric pressure during the milking session, due to the connection with the vacuum pump arrangement.

The receiver may be arranged to collect and house milk extracted during the milking session from only one single animal and to be emptied before a consecutive milking session. Alternatively, the receiver may be arranged to collect and house a part of the milk extracted during the milking session from one single animal and to be emptied one or a plurality of times during the milking session. In this latter case the volume of the receiver may correspond to 2 or 10 liters of milk. Today the average milk yield extracted from an animal may be 40 liters of milk per milking session.

The milking system may advantageously be implemented in a robotic milk station, often referred to as e.g. an Automatic Milking System (AMS), and/or Voluntary Milking System (VMS).

Additionally, the milking system comprises the vacuum regulator for setting the under-pressure prevailing in the receiver to the first level of under-pressure at a commencement of the milking session; and increase the under-pressure prevailing in the receiver during the milking session from the first level of under-pressure, to the second level of under-pressure.

In some embodiments, the under-pressure prevailing in the receiver may be subsequently increased to a third level of under-pressure, fourth level of under-pressure, etc., when the mass flow rate of milk extracted from the teats of the animal exceeds an associated threshold limit.

In yet some embodiments, the under-pressure prevailing in the receiver may be subsequently decreased towards the end of the milking session, as the mass flow rate of milk extracted from the teats of the animal decreases, i.e. falls below a predetermined threshold limit.

It may be advantageous when the first level of under-pressure is between −49 and −40 kPa, such as for example about −42 kPa while the second level of under-pressure is between −55 and −50 kPa, such as for example about −50 kPa below atmospheric pressure.

The under-pressure supplied to the teat cups via the milk evacuation tubes is thereby adjusted by adjusting the under-pressure of the receiver. It then becomes possible to adjust the under-pressure by not running the vacuum pump/vacuum pumps at a constant speed, which saves energy. Milk quality is increased.

By adapting the under-pressure of the receiver, which is supplied to the teat cups via the milk evacuation tubes, to the current mass flow rate of the animal teats, more milk per time unit could be extracted in comparison with extracting milk with a constant under-pressure in the receiver. Thereby, more animals could be served per time unit by the milking system, i.e. higher milk yield. A shorter milking time for each animal also means less stress on teats, which may improve teat condition and udder health. Thereby animal welfare of the herd increases.

Other advantages and additional novel features will become apparent from the subsequent detailed description.

BRIEF DESCRIPTION OF THE DRAWINGS

Embodiments of the invention will now be described in further detail with reference to the accompanying Figures, in which.

DETAILED DESCRIPTION

Figure 1:
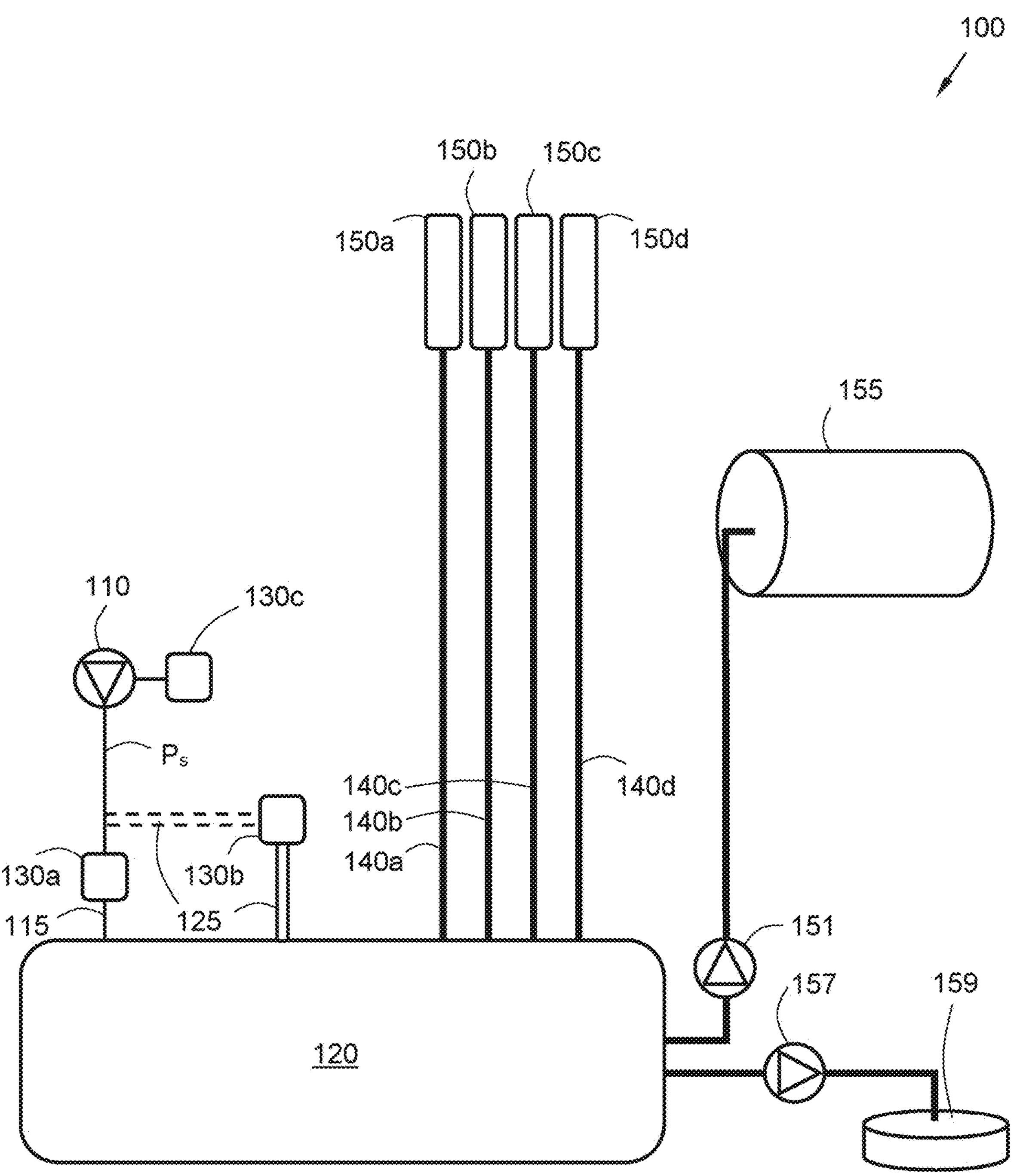
FIG. 1 illustrates a milking system according to an embodiment.

FIG. 1 schematically illustrates a milking system 100 for usage in an agricultural environment, for example a milking robot or rotary platform, in order to extract milk of an animal forming part of a herd of animals at a dairy farm.

"Animal" may be any arbitrary type of domesticated female mammal such as e.g. cow, goat, sheep, camel, horse, dairy buffalo, donkey, yak, etc. (non-exhaustive list of animals). The animal may have four teats, as for example cows, or two teats, such as for example goats and/or sheep. Other animals may have other numbers of teats.

The milking system 100 comprises a vacuum pump arrangement 110, configured to generate a system vacuum pressure $P_s$. The vacuum pump arrangement 110 may comprise one single vacuum pump, or a plurality of vacuum pumps in different embodiments, for example one or several frequency-controlled vacuum pumps.

The vacuum pump arrangement 110 is connected to a receiver 120 via a pipe 115.

The milking system 100 may also comprise a plurality of milk evacuation tubes 140*a*, 140*b*, 140*c*, 140*d*, sometimes also referred to as long milk hose tubes. Each milk evacuation tube 140*a*, 140*b*, 140*c*, 140*d* may be connected to a respective teat cup 150*a*, 150*b*, 150*c*, 150*d*. Each teat cup 150*a*, 150*b*, 150*c*, 150*d* is designed to fit on a respective teat of an animal during milk extraction of that animal in a milking session.

The receiver 120 is connected to the vacuum pump arrangement 110 via the pipe 115, and also connected to each one of the teat cups 150*a*, 150*b*, 150*c*, 150*d* via the respective connected milk evacuation tube 140*a*, 140*b*, 140*c*, 140*d*. An under-pressure in relation to atmospheric pressure prevails in the receiver 120 during the milking session. The receiver 120 is arranged to house milk extracted during the milking session from only one single animal and to be emptied before a consecutive milking session.

The milking system 100 in addition comprises at least one vacuum regulator 130*a*, 130*b*, 130*c*. The at least one vacuum regulator 130*a*, 130*b*, 130*c* is an arrangement for adjusting, i.e. increasing or decreasing, under-pressure prevailing in the receiver 120 during the milking session. Via the at least one vacuum regulator 130*a*, 130*b*, 130*c*, the under-pressure prevailing in the receiver 120 is set to a first level of under-pressure at a commencement of the milking session. The first level of under-pressure may be set between −49 and −40 kPa, such as for example about −42 kPa below atmospheric pressure.

The at least one vacuum regulator 130*a*, 130*b*, 130*c* is arranged to increase the under-pressure prevailing in the receiver 120 during the milking session from the first level of under-pressure, to a second level of under-pressure when the mass flow rate of milk extracted from the teats of the animal during the milking session is high, i.e. exceeding a threshold limit, or estimated to be flowing from the animal teats.

The herein utilised expression "mass flow rate of milk extracted from the teats of the animal during the milking session" may be interpreted as mass flow rate of milk extracted from all teats of the animal (cluster milking), or mass flow rate per teat of milk extracted from all teats of the animal (quarter milking).

The expression "high" in this context, referring to mass flow rate of milk extracted from the teats, is to be understood as the state wherein a predetermined mass flow rate threshold limit is exceeded by the measured mass flow rate. The predetermined mass flow rate threshold limit may for example be set to 3 kg/minute in cluster milking and/or 1 kg/minute in quarter milking (non-limiting examples).

The second level of under-pressure may be between about −55 and −50 kPa, such as for example about −50 kPa below atmospheric pressure.

The mass flow rate of milk extracted from the teats of the animal may be estimated, indirectly measured, or be measured in absolute terms in different embodiments, with a measuring instrument.

An example of a measuring instrument estimating the mass flow rate may for example be a timer, which is started at the beginning of the milking session. The estimation is then based on the assumption that after having stimulated/extracted milk for a certain time period (i.e. a time threshold limit), it may be assumed that the mass flow rate of milk extracted from the teats of the animal is high.

An advantage of this embodiment is that a very robust and easily implemented solution is achieved at a low cost.

Another example of a measuring instrument estimating the mass flow rate may be a weighting scale, arranged to measure the weight of the amount of milk in the receiver 120, from the commencement of the milking session. The estimation is then based on the assumption that after having extracted a certain amount of milk from the animal from the commencement of the milking session (i.e. a threshold weight limit), it may be assumed that the mass flow rate of milk extracted from the teats of the animal is high.

In yet some embodiments, the measuring instrument estimating the mass flow rate may be arranged to measure volume of liquid accumulated in the receiver 120 during the milking session, from the commencement of the milking session. The measuring instrument may for example comprise a float switch, or level sensor, arranged in the receiver 120 for detecting level of extracted milk within the receiver 120 during the milking session, from the commencement of the milking session. The estimation is then again based on the assumption that after having extracted a certain amount of milk from the animal (i.e. a threshold volume limit) from the commencement of the milking session, it may be assumed that the mass flow rate of milk extracted from the teats of the animal is high.

The measuring instrument for estimating any one of a mass flow rate of liquid flowing into the receiver 120 during the milking session, a difference in weight per time unit of liquid accumulated in the receiver 120, and/or a difference in volume per time unit of liquid accumulated in the receiver 120.

This may be realised by measuring the weight of the receiver 120 and/or volume of extracted milk at a regular time interval, such as for example every second, every tenth of a second, every ten seconds, etc.; or any time interval there in between. The difference in weight per time unit and/or difference in volume per time unit of the extracted milk between the respective measurements may then be compared with a threshold mass flow rate limit.

The measuring instrument arranged to measure a measurement indicative of a mass flow rate of milk extracted from the teats of the animal during the milking session may comprise a plurality of sensors in some embodiments. One respective sensor of the plurality of sensors may be arranged in a respective milk evacuation tube 140*a*, 140*b*, 140*c*, 140*d*, to measure the mass flow rate of liquid passing a section of that milk evacuation tube 140*a*, 140*b*, 140*c*, 140*d* between the teat cup 150*a*, 150*b*, 150*c*, 150*d* and the receiver 120 during the milking session.

Thereby reliable measurements are obtained of the mass flow rate per teat of milk extracted from each one of the teats of the animal, minimising risks of increasing the supplied under-pressure while mass flow rate of one or several teats is low/below the threshold limit.

In yet some embodiments, wherein the measuring instrument may comprise a plurality of sensors, one respective sensor of the plurality of sensors may be arranged in a respective air tube of the milk evacuation tubes 140*a*, 140*b*, 140*c*, 140*d*, to measure under-pressure level in the air tube. Thereby, an indirect measurement may be made of a vacuum drop due to high mass flow rate per teat of milk extracted from each one of the teats of the animal during the milking session.

Although indirect measurements of the respective mass flow rate may be made, the measurements could be regarded as reliable, minimising risks of increasing the supplied under-pressure while mass flow rate of one or several teats is low/below the threshold limit.

Irrespectively of how the measurement indicative of a mass flow rate of milk extracted from the teats of the animal during the milking session is estimated or measured, the inventive concept comprises application of an under-pressure in the receiver 120 at the first under-pressure level when the milk mass flow rate is low. When the milk mass flow rate is high, the under-pressure in the receiver 120 may be changed to the second under-pressure level.

Hereby, the teats are protected from excessive under-pressure when the milk mass flow rate is low, while milk is efficiently extracted when the milk mass flow rate is high by applying a high under-pressure.

The at least one vacuum regulator 130*a*, 130*b*, 130*c* may be implemented in several distinct embodiments.

Figure 6A:
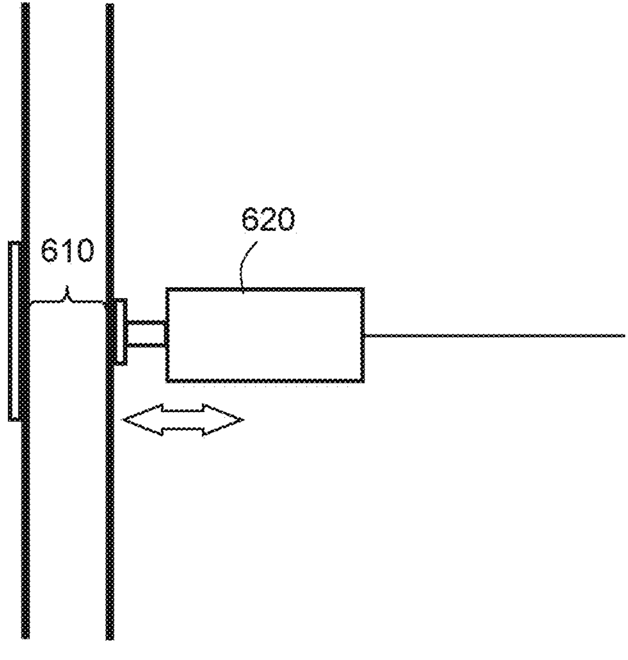
FIG. 6A conceptually illustrates a vacuum regulator and/or valve device of the milking system according to an embodiment.
Figure 6B:
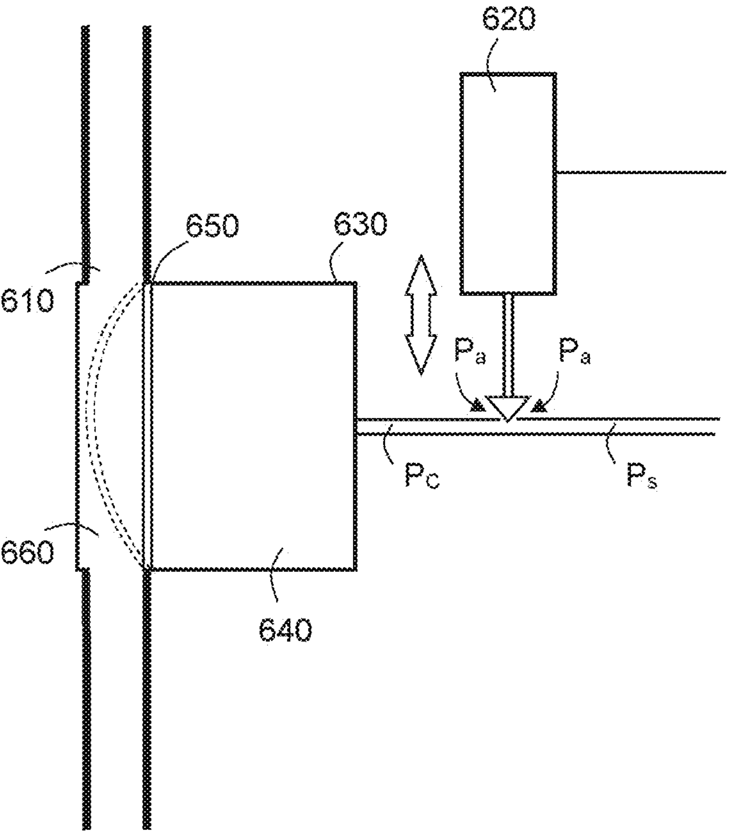
FIG. 6B conceptually illustrates a vacuum regulator/or valve device of the milking system according to an embodiment.

The vacuum regulator 130*a* may for example be arranged to adjust an adjustable passage of the pipe 115 between the vacuum pump arrangement 110 and the receiver 120, for example by moving an actuator for reducing, or increasing, the adjustable passage. The functionality of the vacuum regulator 130*a* and the adjustment of the adjustable passage of the pipe 115 is illustrated in FIG. 6A-6B and further discussed in the corresponding section of the description.

The vacuum regulator 130*b* may alternatively be arranged to repeatedly and alternatingly open and close an opening of an inlet 125 of atmospheric pressure to the receiver 120 at a first frequency when the first level of under-pressure is desired in the receiver 120. Alternatively, the inlet 125 of atmospheric pressure may be made to the pipe 115. When the second level of under-pressure is desired in the receiver 120, the vacuum regulator 130*b* may instead open and close the opening at a second frequency.

In yet some embodiments, the vacuum regulator 130*c* may increase speed of the vacuum pump arrangement 110, from a first speed level to a second speed level.

The under-pressure prevailing in the receiver 120 may be set and adjusted by one or several vacuum regulators 130*a*, 130*b*, 130*c*. When several vacuum regulators 130*a*, 130*b*, 130*c* are applied, they may be of the same type or of different types in different embodiments, in any combination.

When the milking session is terminated, the teat cups 150*a*, 150*b*, 150*c*, 150*d* may be released from the animal teats. The milk of the animal, collected in the receiver 120 during the milking session, may be checked with various quality tests. The tests may be for example somatic cell count, detection of impurity or contamination of the milk, detection of blood in the milk, etc.

When/if the milk quality is approved, the milk is forwarded from the receiver 120 to the cooling tank 155, using a first liquid pump 151.

In case the milk is not approved by the quality test, the milk may be forwarded from the receiver 120 to a second tank 159, using a second liquid pump 157.

During the evacuation of milk from the receiver 120, atmospheric pressure may be entered via the air inlet 125, while closing a non-disclosed valve arranged in the pipe 115 between the vacuum pump arrangement 110 and the receiver 120.

When the receiver 120 has been emptied from milk, the next animal is allowed to enter the milking system and commence her milking session.

Figure 2:
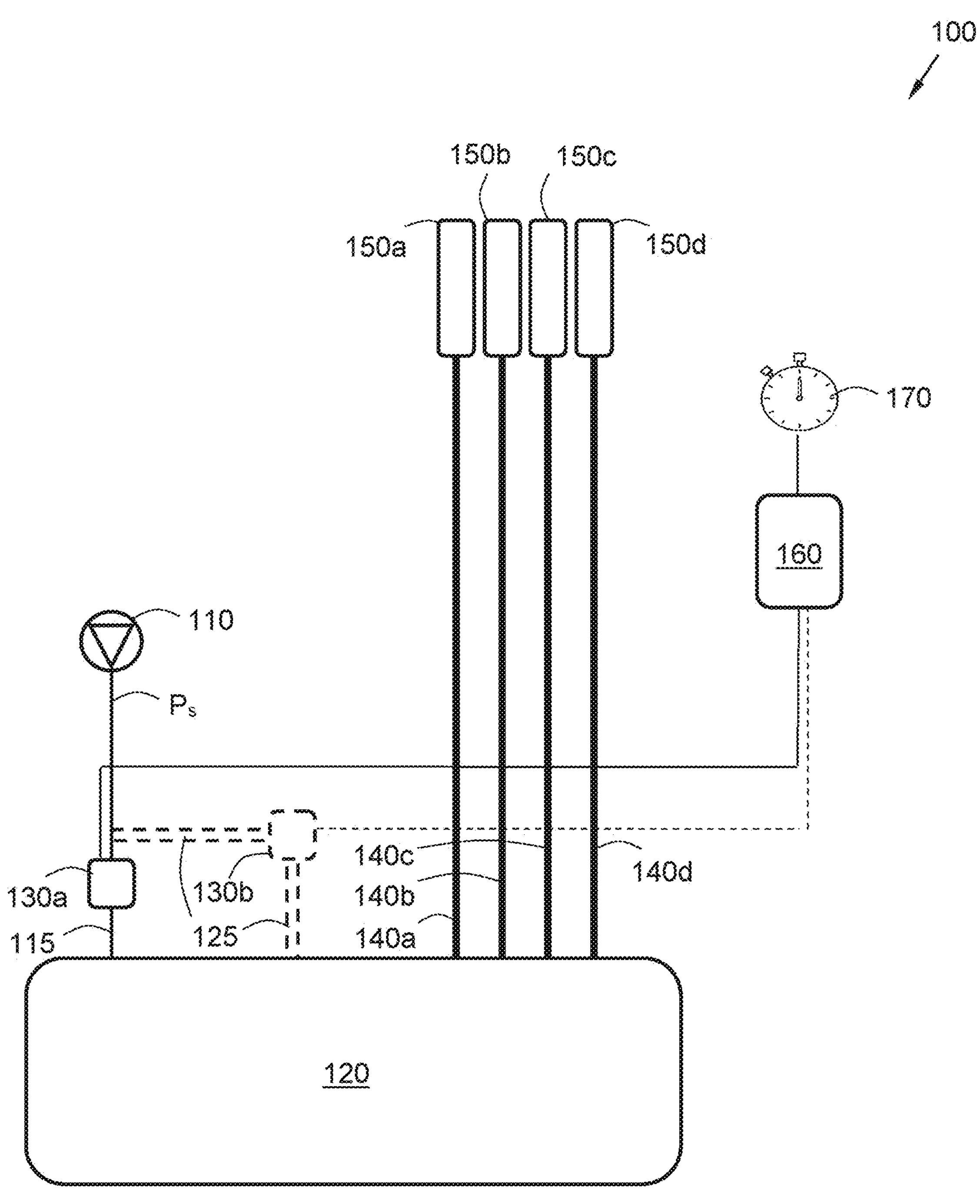
FIG. 2 illustrates a milking system according to an embodiment.

FIG. 2 schematically illustrates an alternative embodiment of the milking system 100 of FIG. 1. Components similar to the ones disclosed in FIG. 1 and already described in the corresponding section of the description, are denoted with the same reference numbers.

In the illustrated embodiment of the milking system 100, the measuring instrument 170 may be arranged to measure a measurement indicative of a mass flow rate of milk extracted from the teats of the animal during the milking session. The measuring instrument 170 may for example comprise a timer, as illustrated in FIG. 2.

The illustrated milking system 100 may also comprise a controller 160, which may be communicatively connected to the measuring instrument 170 and also communicatively connected to the at least one vacuum regulator 130*a*, 130*b*, 130*c*.

The controller 160 may comprise one or more instances of a processing circuit/circuitry, i.e. a Central Processing Unit (CPU), an Application Specific Integrated Circuit (ASIC), a microprocessor, a Graphics Processing Unit (GPU), an Electronic Control Unit (ECU), or other processing logic that may interpret and execute instructions. The herein utilised expression "processing circuitry" may thus represent a processing circuitry comprising a plurality of processing circuits, such as, e.g., any, some or all of the ones enumerated above.

The controller 160 may be configured to, repeatedly during the milking session, obtain measurements from the measuring instrument 170. Also, the controller 160 may be configured to compare each obtained measurement with a threshold limit. In addition, the controller 160 may be configured to generate and provide a control signal to the at least one vacuum regulator 130*a*, 130*b*, 130*c*, to switch the under-pressure level prevailing in the receiver 120 from the first level of under-pressure to the second level of under-pressure, based on the comparison between the obtained measurement and the threshold limit.

The timer measuring instrument 170 may be arranged to be started at a starting point in time, which starting point is related to the commencement of the milking session. The starting point may be for example when the first and/or last teat cup 150*a*, 150*b*, 150*c*, 150*d* is attached to the animal teats; when pre-stimulation of the teats is commenced; etc.

The elapsed time since the start of the timer measuring instrument 170 may be monitored by the controller 160, and continuously compared with a time threshold limit. The time threshold limit represents a length of time after which a high mass flow rate of milk extracted from the teats could reasonably be expected, i.e. a mass flow rate exceeding a mass flow rate limit.

The controller 160 may, with general advantage be configured to perform the above-described procedure in an automatic manner by executing a computer program. Therefore, according to some embodiment, the controller 160 may comprise a memory unit, i.e., nonvolatile data carrier, storing the computer program, which, in turn, may contain software for making a processing circuitry in the form of at least one processor in the controller 160 to execute the above-described actions when the computer program is run on the processing circuitry.

The milking system 100 may in addition also comprise a database or data storage memory in some embodiments, communicatively connected to the controller 160. The optional database may be configured to store data, for example related to various desired under-pressure levels, desired under-pressure level intervals and/or threshold levels.

Figure 3:
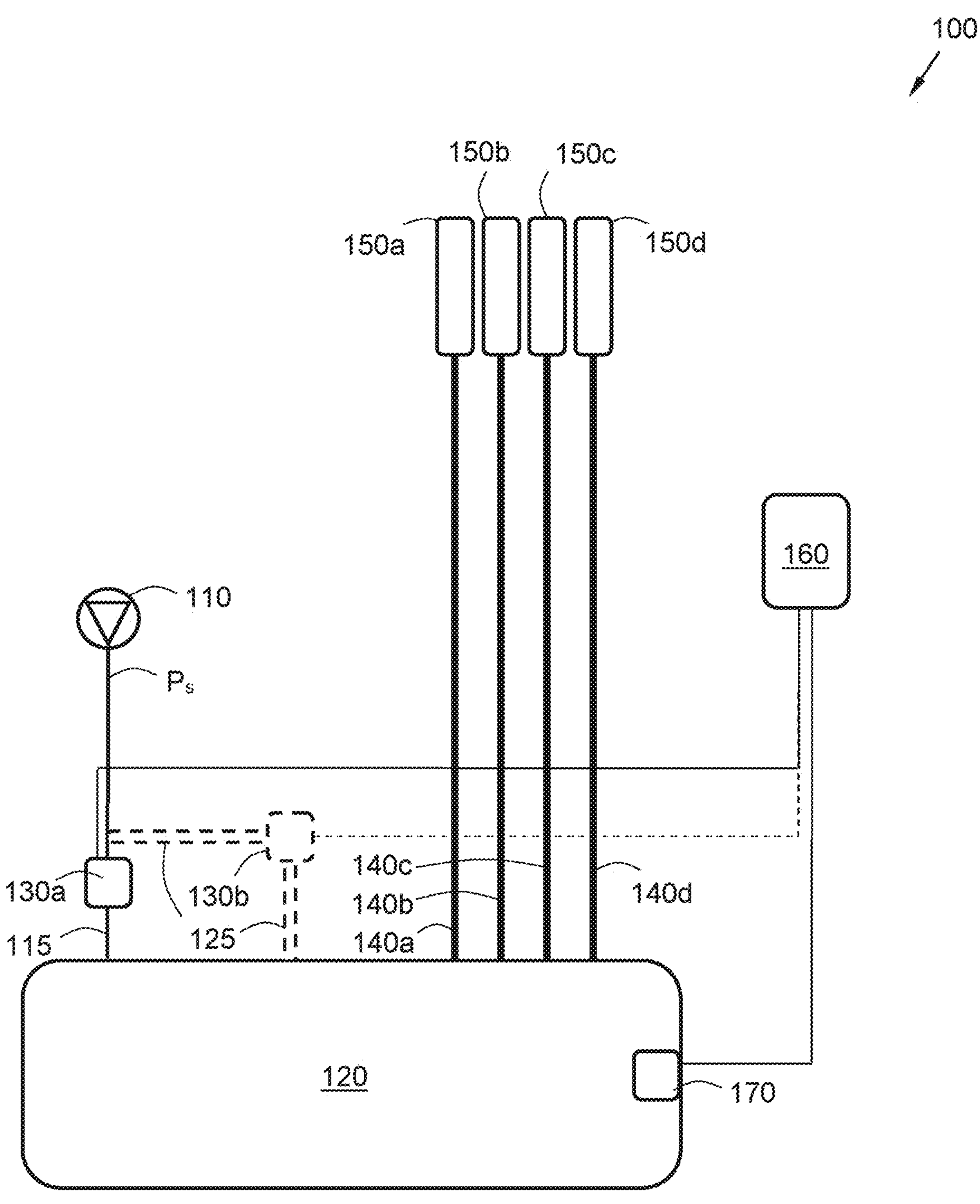
FIG. 3 illustrates a milking system according to an embodiment.

FIG. 3 schematically illustrates an alternative embodiment of the milking system 100 of FIG. 1. Components similar to the ones disclosed in FIG. 1 and already described in the corresponding section of the description, are denoted with the same reference numbers.

The illustrated embodiment of the milking system 100 may comprise a measuring instrument 170, which may be arranged to measure volume of liquid accumulated in the receiver 120 from the commencement of the milking session. In the illustrated embodiment, the measuring instrument 170 comprises a float switch, or level sensor, applied in the receiver 160 arranged to measure level of extracted milk in the receiver 160, and thereby measuring the volume of the extracted milk. Thereby, an indirect measurement is made, for indicating the mass flow rate of milk extracted from the teats of the animal from the commencement of the milking session.

Other embodiments of the measuring instrument 170 may comprise a weighing scale arranged to continuously measure mass of liquid accumulated in the receiver 120 from the commencement of the milking session. In yet some embodiments, the measuring instrument 170 may be arranged to measure for example a mass flow rate of liquid flowing into the receiver 120 during the milking session, a difference in weight per time unit of liquid accumulated in the receiver 120, and/or a difference in volume per time unit of liquid accumulated in the receiver 120.

The controller 160 may also be configured to, repeatedly during the milking session, obtain measurements from the measuring instrument 170 and compare it with the corresponding threshold limit.

When the measurement concerns weight of extracted liquid accumulated in the receiver 120, the threshold limit may comprise a threshold weight limit. When the measurement concerns extracted volume of liquid accumulated in the receiver 120, the threshold limit may comprise a threshold volume limit. When the measurement concerns extracted mass flow rate of liquid flowing into the receiver 120, the threshold limit may comprise a threshold mass flow rate limit, often calculated for example in grams per minute, g/min.

The controller 160 may be configured to, when the threshold limit is exceeded, generate and provide a control signal to the at least one vacuum regulator 130*a*, 130*b*, 130*c*, to switch the under-pressure level prevailing in the receiver 120 from the first level of under-pressure to the second level of under-pressure, based on the comparison between the obtained measurement and the threshold limit.

Figure 4:
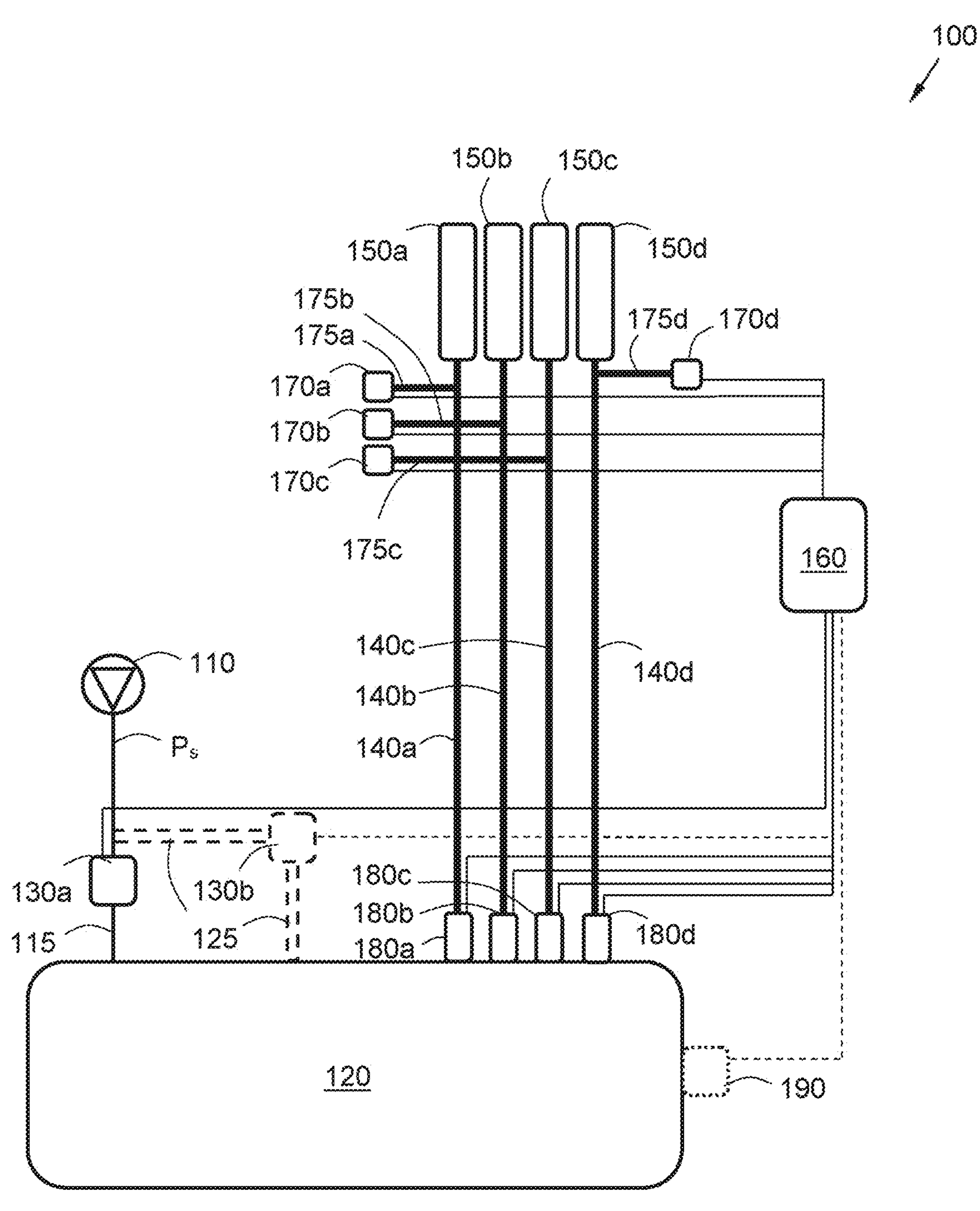
FIG. 4 illustrates a milking system according to an embodiment.

FIG. 4 schematically illustrates an alternative embodiment of the milking system 100 of FIG. 1. Components similar to the ones disclosed in FIG. 1 and described in the corresponding section of the description, are denoted with the same reference numbers.

The measuring instrument 170 in the illustrated embodiment of the milking system 100 may comprise a plurality of sensors 170*a*, 170*b*, 170*c*, 170*d*, wherein one respective sensor 170*a*, 170*b*, 170*c*, 170*d* of the plurality of sensors 170*a*, 170*b*, 170*c*, 170*d* may be arranged in a respective air tube 175*a*, 175*b*, 175*c*, 175*d* of the milk evacuation tubes 140*a*, 140*b*, 140*c*, 140*d*, to measure under-pressure level in the air tube 175*a*, 175*b*, 175*c*, 175*d*.

The respective air tube 175*a*, 175*b*, 175*c*, 175*d* may be arranged to supply air into the milk evacuation tube 140*a*, 140*b*, 140*c*, 140*d* during the milking session.

Thus, each sensor 170*a*, 170*b*, 170*c*, 170*d* may be associated with a respective air tube 175*a*, 175*b*, 175*c*, 175*d*, a respective milk evacuation tube 140*a*, 140*b*, 140*c*, 140*d* and a respective teat cup 150*a*, 150*b*, 150*c*, 150*d*. Thereby, each sensor 170*a*, 170*b*, 170*c*, 170*d* may measure a vacuum drop indicative of mass flow rate of the teats.

In some embodiments, the milking system 100 may comprise a plurality of valve devices 180*a*, 180*b*, 180*c*, 180*d*. Each valve device 180*a*, 180*b*, 180*c*, 180*d* of the plurality of valve devices 180*a*, 180*b*, 180*c*, 180*d* may be arranged in one respective milk evacuation tube 140*a*, 140*b*, 140*c*, 140*d* of the plurality of milk evacuation tubes 140*a*, 140*b*, 140*c*, 140*d*, to reduce or increase under-pressure upstream of the valve device 180*a*, 180*b*, 180*c*, 180*d*, in the milk flow direction, during the milking session by reducing or increasing an adjustable passage of the respective valve device 180*a,* 180*b,* 180*c,* 180*d,* from a first position at the beginning of the milking session.

The expression "upstream" and/or "downstream" in the current context refers to the liquid flow path, i.e. the milk flow during milk extraction in the milking session, or cleaning liquid flow during Cleaning In Place (CIP) cleaning; from the teat cups 150*a,* 150*b,* 150*c,* 150*d,* via the respective milk evacuation tube 140*a,* 140*b,* 140*c,* 140*d* to the receiver 120.

The functionality of the valve device 180*a,* 180*b,* 180*c,* 180*d* and the adjustment of the adjustable passage of the respective valve device 180*a,* 180*b,* 180*c,* 180*d* according to some embodiments are illustrated in FIGS. 6A-6B and further discussed in the corresponding section of the description.

The controller 160 may be communicatively connected to each one of the valve devices 180*a,* 180*b,* 180*c,* 180*d* in some embodiments. The controller 160 may be configured to obtain a measurement from each respective sensor 170*a,* 170*b,* 170*c,* 170*d.* The controller 160 may then compare each one of the obtained measurements with the threshold limit. The threshold limit may be set to vacuum drop resulting from a mass flow rate, indicating a high mass flow rate of milk extracted from the teats, i.e. a mass flow rate exceeding a mass flow rate limit.

The controller 160 may also be configured to, when the obtained measurement from one sensor 170*a,* 170*b,* 170*c,* 170*d* exceeds the threshold limit: generate and provide a control signal to the valve device 180*a,* 180*b,* 180*c,* 180*d* of the milk evacuation tube 140*a,* 140*b,* 140*c,* 140*d* of the sensor 170*a,* 170*b,* 170*c,* 170*d,* to reduce, or increase, the respective adjustable passage, thereby decreasing, or increasing, the under-pressure upstream the valve device 180*a,* 180*b,* 180*c,* 180*d.*

Hereby, a substantially constant fluid pressure may be maintained in the teat cups 150*a,* 150*b,* 150*c,* 150*d,* regardless of the current mass flow rate of a teat. It is thereby possible to apply a relatively high milking vacuum, i.e. relatively high under-pressure in the receiver 120, yet assuring teat integrity by not exposing the animal teat for a too high under-pressure.

In yet some embodiments, the controller 160 may alternatively be configured to generate and provide a control signal to the at least one vacuum regulator 130*a,* 130*b,* 130*c,* to switch the under-pressure level prevailing in the receiver 120 from the first level of under-pressure to the second level of under-pressure, when obtained measurements of all sensors 170*a,* 170*b,* 170*c,* 170*d* exceeds the threshold limit.

The controller 160 may alternatively be configured to generate and provide a control signal to the at least one vacuum regulator 130*a,* 130*b,* 130*c,* to switch the under-pressure level prevailing in the receiver 120 from the first level of under-pressure to the second level of under-pressure, when obtained measurements of at least one sensor 170*a,* 170*b,* 170*c,* 170*d* exceeds the threshold limit. Also, the controller 160 may be configured to generate and provide a control signal to the valve devices 180*a,* 180*b,* 180*c,* 180*d* of the milk evacuation tube 140*a,* 140*b,* 140*c,* 140*d* for which sensor measurements exceeding the threshold limit have not been obtained, to reduce, or increase, the respective adjustable passage, thereby decreasing, or increasing, the under-pressure upstream the valve device 180*a,* 180*b,* 180*c,* 180*d.*

The milking system 100 may also comprise a pressure sensor 190, for measuring pressure inside the receiver 120. The pressure sensor 190 may be communicatively connected to the controller 160. The pressure sensor 190 may provide pressure measurements of the receiver 120 to the controller 160. The controller 160 may then compare the obtained pressure measurement with a desired under-pressure in the receiver 120. In case the obtained pressure measurement deviates from the desired under-pressure, controller 160 may generate and send a control signal to the at least one vacuum regulator 130*a,* 130*b,* 130*c,* to either increase or decrease the under-pressure provided to the receiver 120.

Figure 5:
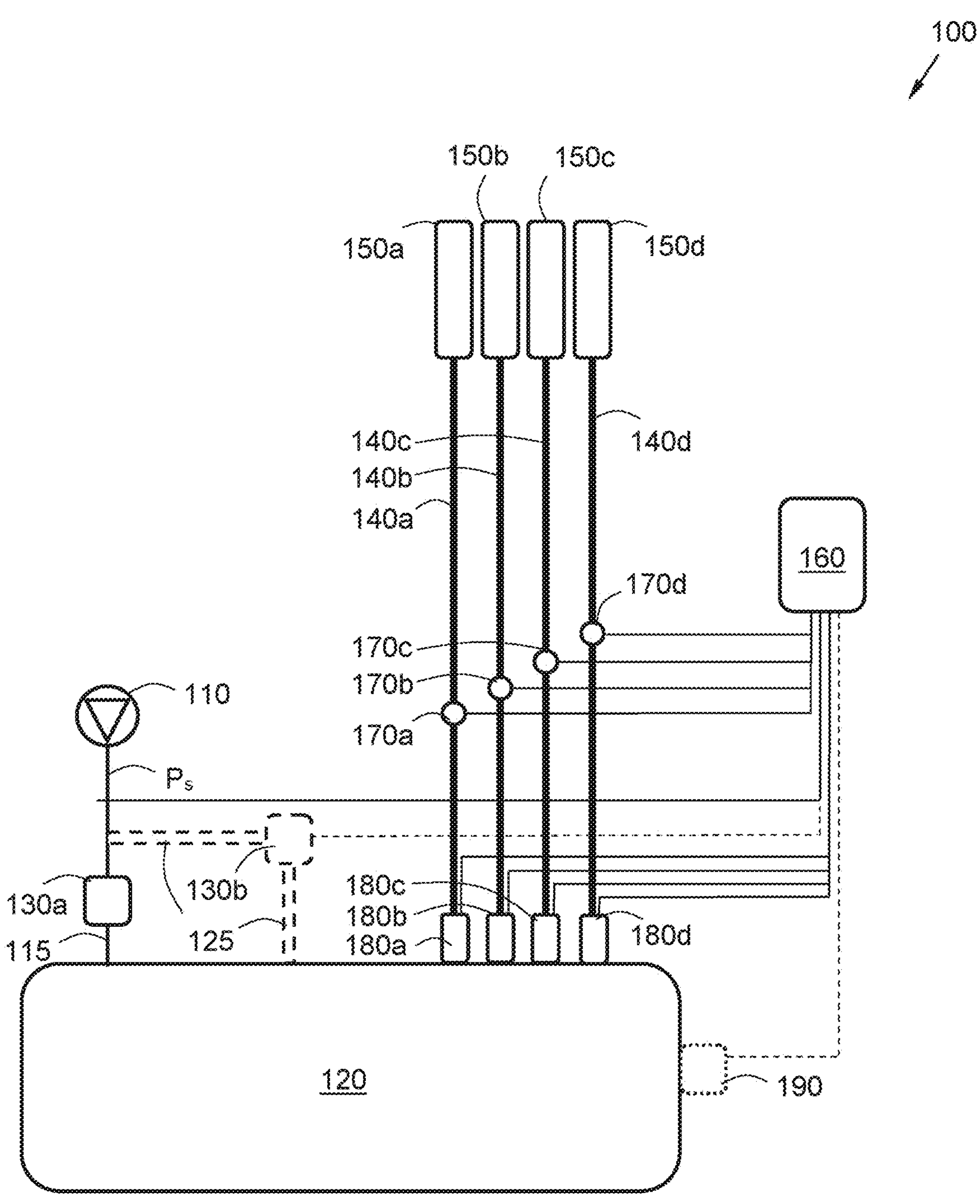
FIG. 5 illustrates a milking system according to an embodiment.

FIG. 5 schematically illustrates an alternative embodiment of the milking system 100 of FIG. 1. Components similar to the ones disclosed in FIG. 1 and described in the corresponding section of the description, are denoted with the same reference numbers.

However, one respective sensor 170*a,* 170*b,* 170*c,* 170*d* of the plurality of sensors 170*a,* 170*b,* 170*c,* 170*d* may be arranged in each milk evacuation tube 140*a,* 140*b,* 140*c,* 140*d,* to measure the mass flow rate of liquid passing a section of that milk evacuation tube 140*a,* 140*b,* 140*c,* 140*d* between the teat cup 150*a,* 150*b,* 150*c,* 150*d* and the receiver 120 during the milking session.

The milking system 100 may comprise a plurality of valve devices 180*a,* 180*b,* 180*c,* 180*d.* Each valve device 180*a,* 180*b,* 180*c,* 180*d* of the plurality of valve devices 180*a,* 180*b,* 180*c,* 180*d* may be arranged in one respective milk evacuation tube 140*a,* 140*b,* 140*c,* 140*d* of the plurality of milk evacuation tubes 140*a,* 140*b,* 140*c,* 140*d,* to reduce or increase under-pressure upstream of the valve device 180*a,* 180*b,* 180*c,* 180*d,* in the milk flow direction, during the milking session by reducing or increasing an adjustable passage of the respective valve device 180*a,* 180*b,* 180*c,* 180*d,* from a first position at the beginning of the milking session.

The controller 160 may be communicatively connected to each one of the valve devices 180*a,* 180*b,* 180*c,* 180*d* in some embodiments. The controller 160 may be configured to obtain a measurement from each respective sensor 170*a,* 170*b,* 170*c,* 170*d.* The controller 160 may then compare each one of the obtained measurements with the threshold limit. The threshold limit may be set to a threshold mass flow rate per teat limit, indicating that the mass flow rate of milk per teat is high, i.e. exceeding a mass flow rate of milk per teat threshold limit.

The controller 160 may also be configured to, when the obtained measurement from one sensor 170*a,* 170*b,* 170*c,* 170*d* exceeds the threshold limit: generate and provide a control signal to the valve device 180*a,* 180*b,* 180*c,* 180*d* of the milk evacuation tube 140*a,* 140*b,* 140*c,* 140*d* of the sensor 170*a,* 170*b,* 170*c,* 170*d,* to reduce, or increase, the respective adjustable passage, thereby decreasing, or increasing, the under-pressure upstream the valve device 180*a,* 180*b,* 180*c,* 180*d.*

In yet some embodiments, the controller 160 may alternatively be configured to generate and provide a control signal to the at least one vacuum regulator 130*a,* 130*b,* 130*c,* to switch the under-pressure level prevailing in the receiver 120 from the first level of under-pressure to the second level of under-pressure, when obtained measurements of all sensors 170*a,* 170*b,* 170*c,* 170*d* exceeds the threshold limit.

The controller 160 may alternatively be configured to generate and provide a control signal to the at least one vacuum regulator 130*a,* 130*b,* 130*c,* to switch the under-pressure level prevailing in the receiver 120 from the first level of under-pressure to the second level of under-pressure, when obtained measurements of at least one sensor 170*a,* 170*b,* 170*c,* 170*d,* but not all sensors 170*a,* 170*b,* 170*c,* 170*d,* exceeds the threshold limit. Also, the controller 160 may be configured to generate and provide a control signal to the valve devices 180a, 180b, 180c, 180d of the milk evacuation tube 140a, 140b, 140c, 140d for which sensor measurements exceeding the threshold limit have not been obtained, to reduce, or increase, the respective adjustable passage, thereby decreasing, or increasing, the under-pressure upstream the valve device 180a, 180b, 180c, 180d.

FIGS. 6A and 6B illustrate some embodiments of a throttle device, or a valve device with a controllable vacuum drop. Any such device may be used for implementing the vacuum regulator 130a, 130b, 130c and/or the valve device 180a, 180b, 180c, 180d comprised in some embodiments of the milking system 100.

The throttle device illustrated in FIG. 6A, when used for implementing the vacuum regulator 130a on the pipe 115 between the vacuum pump arrangement 110 and the receiver 120 may be arranged to set and/or adjust (i.e., either increase or decrease) the under-pressure prevailing in the receiver 120 during the milking session, by adjusting an adjustable passage 610 of the pipe 115. The adjustable passage 610 may be reduced, or increased, by moving an actuator 620. The size of the adjustable passage 610 may thereby be altered.

Also, or alternatively, the throttle device may be used for implementing the valve devices 180a, 180b, 180c, 180d, arranged between the receiver 120 and the respective teat cup 150a, 150b, 150c, 150d via the respective milk evacuation tube 140a, 140b, 140c, 140d. The under-pressure in the milk evacuation tube 140a, 140b, 140c, 140d upstream the valve device 180a, 180b, 180c, 180d may be set and/or adjusted by adjusting the adjustable passage 610 of the milk evacuation tube 140a, 140b, 140c, 140d, by moving the actuator 620.

The expression "upstream" refers to the liquid flow path, i.e. the milk flow during milk extraction in the milking session, from the teat cup 150a, 150b, 150c, 150d, via the respective milk evacuation tube 140a, 140b, 140c, 140d to the receiver 120.

The actuator 620 may be arranged to receive the control signal from the controller 160. The actuator 620 may comprise a cylinder driven by an electrical motor or similar device and a first and a second plate. The pipe 115 and/or milk evacuation tube 140a, 140b, 140c, 140d may be comprised between a first plate and a second plate. The cylinder may act on one of the first plate, or the second plate, thereby adjusting the adjustable passage 610 based on the received control signals of the controller 160 by adjusting the position of the first plate in relation to the second plate.

FIG. 6B schematically illustrates yet an embodiment of the throttle device, or valve device with a controllable vacuum drop. The throttle device may be used for implementing the vacuum regulator 130a, 130b, 130c and/or the valve device 180a, 180b, 180c, 180d comprised in some embodiments of the milking system 100.

The throttle device when used for implementing the vacuum regulator 130a may be arranged to set and/or adjust (i.e., either increase or decrease) the under-pressure prevailing in the receiver 120 during the milking session, by adjusting an adjustable passage 610 of the pipe 115 between the vacuum pump arrangement 110 and the receiver 120.

The throttle device when used for implementing the valve devices 180a, 180b, 180c, 180d may be arranged to set and/or adjust the under-pressure in the respective milk evacuation tube 140a, 140b, 140c, 140d upstream the valve devices 180a, 180b, 180c, 180d.

The throttle device forming the controllable vacuum regulator 130a and/or the valve device 180a, 180b, 180c, 180d may comprise an actuator 620, such as for example a solenoid, and an air valve. The throttle device may also comprise a valve 630, such as a controllable valve, shut-off valve or other similar valve arrangement.

The valve 630 may comprise a first section 660 and a second section 640, separated by a flexible membrane 650. The pipe 115 or the milk evacuation tube 140a, 140b, 140c, 140d depending on implementation may pass the first section 660 via the adjustable passage 610. The flexible membrane 650 may be configured to close the adjustable passage 610 of the pipe 115 and/or the milk evacuation tube 140a, 140b, 140c, 140d when atmospheric air pressure is provided to the second section 640 and to open the adjustable passage 610 when a control vacuum $P_c$ at a large under-pressure is provided to the second section 640.

A control vacuum $P_c$ is generated by mixing the system vacuum pressure $P_s$ with atmospheric air pressure $P_a$.

The actuator 620 may comprise a regulator block connected to the vacuum pump arrangement 110 and consequently the system vacuum $P_s$. Moreover, the regulator block may be connected to atmospheric air pressure $P_a$ via an air valve that is connected to the solenoid.

By controlling the solenoid, the air valve may open to atmospheric air pressure $P_a$ and the solenoid may be controlled such that the frequency with which the air valve is opened regulates the inlet of air and consequently the mixture of atmospheric air pressure $P_a$ and system vacuum pressure $P_s$ for generating the control vacuum $P_c$ at a desired level.

The actuator 620 may be arranged to receive the control signal from the controller 160. Based on the received control signal, the actuator 620 may adjust the level of control vacuum $P_c$ provided to the valve 630 by increasing/reducing the opening of the air valve for adjusting the amount of inlet atmospheric air pressure $P_a$. The control vacuum $P_c$ may be provided to the valve 630, wherein the valve 630 is arranged to adjust the adjustable passage 610 according to the provided control vacuum $P_c$.

By regulating the adjustable passage 610 in a controlled manner, the under-pressure level supplied to the receiver 120 and/or upstream the valve device 180a, 180b, 180c, 180d may be adjusted.

The vacuum pressure level may thus be adjusted via the adjustable passage 610. A control vacuum level provided to the second section 640 may adjust the size of the adjustable passage 610 by acting on the flexible membrane 650, which in turn adjusts the passage 610, thereby causing a controllable drop in pressure when the control vacuum $P_c$ provided to the second section 640 of the controllable valve 630 is decreased.

The provided control vacuum $P_c$ acts on the flexible membrane 650. The adjustable passage 610 may thereby be increased as the flexible membrane 650 opens up the passage 610.

When the actuator 620 receives control signals from the controller 160 to decrease the adjustable passage 610, more atmospheric pressure $P_a$ is inlet to the control vacuum $P_c$ thereby decreasing (i.e. less under-pressure) the under-pressure level of the control vacuum $P_c$. The increased control vacuum $P_c$ is then provided to the second section 640, thereby causing the flexible membrane 650 to collapse by the atmospheric pressure, which closes the adjustable passage 610.

The control signalling of the controller 160 may e.g. comprise Pulse Width Modulation (PWM) signals provided to the actuator 620. The solenoid of the actuator 620 may then cause the regulator block to open/close the air valve which adjusts the inlet of atmospheric air pressure $P_a$ based on the PWM signals. The pressure level of the control vacuum $P_c$ provided to the controllable valve 630 is thereby adjusted according to the received control signals.

Figure 7:
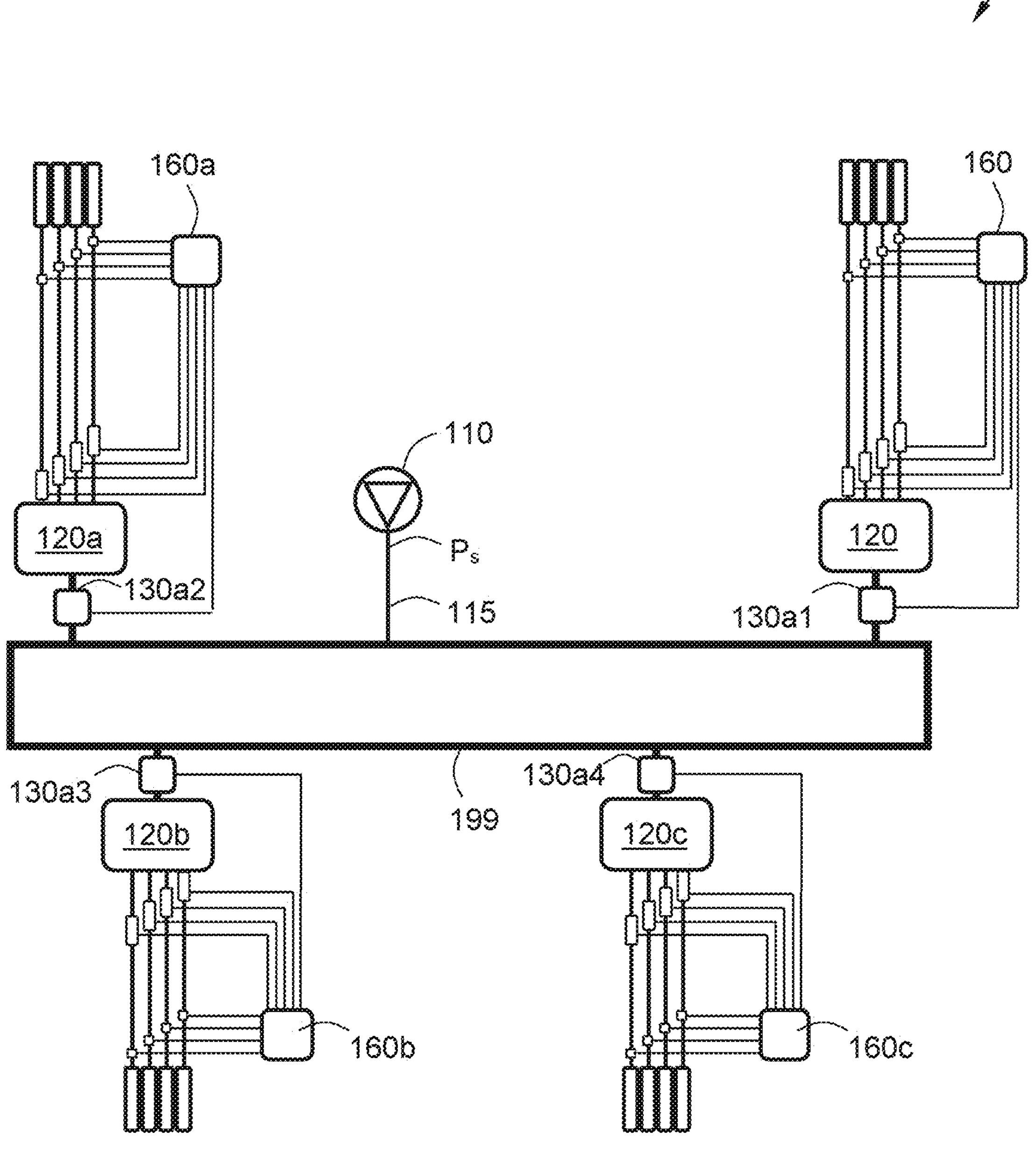
FIG. 7 conceptually illustrates a milking system comprising a plurality of milking points, according to an embodiment.

FIG. 7 schematically illustrates an embodiment of a milking system 100 comprising a plurality of milking points, four in the illustrated embodiment, connected to a common vacuum pump arrangement 110 via a common ring line 199, providing system vacuum $P_s$.

In the illustrated embodiment, each milking point may comprise a set of teat cups 150*a,* 150*b*, 150*c,* 150*d,* connected via a respective milk evacuation tube 140*a,* 140*b,* 140*c,* 140*d* to a respective receiver 120, 120*a*, 120*b*, 120*c*.

A respective controller 160, 160*a,* 160*b,* 160*c* of each milking point may be communicatively connected to the measuring instruments 170 of that milking point and also communicatively connected to a respective at least one vacuum regulator 130*a*1, 130*a*2, 130*a*3, 130*a*4.

The controller 160, 160*a,* 160*b,* 160*c* may obtain measurements from the measuring instruments 170 of the milking point, compare them with a threshold limit and, when the obtained measurement value exceeds the threshold limit, adjust (i.e. increase or decrease) the under-pressure of the corresponding receiver 120, 120*a*, 120*b*, 120*c* by generating and sending an adjustment command to the at least one vacuum regulator 130*a*1, 130*a*2, 130*a*3, 130*a*4.

The respective milking points of the embodiment illustrated in FIG. 7 may be implemented according to any single one, or any meaningful combination of the embodiments illustrated in any one of FIGS. 1-5 and discussed in the corresponding respective section of the description.

Thanks to the disclosed concept, a methodology has been developed towards an efficient milk extraction by ensuring an adapted fluid pressure level under the teats, yet conserving teat integrity.

The various illustrated embodiments depicted in FIGS. 1-7, and/or discussed in the corresponding respective section of the description may with advantage be combined with each other, for example by mixing and compiling features of some or all of the described embodiments, thereby achieving additional advantages.

The invention claimed is:

1. A milking system (100), comprising:

a vacuum pump (110) connected to a pipe (115) and configured to generate a system vacuum pressure (Ps); and plural milking points, each milking point comprising a plurality of teat cups (150*a*, 150*b*, 150*c*, 150d), each configured to fit on a respective teat of an animal during milk extraction in a milking session, a receiver (120, 120*a*, 120*b*, 120*c*), wherein said receiver (120, 120*a*, 120*b*, 120*c*) is arranged to house milk extracted during the milking session from only a single one animal at a respective single one of the milking points and to be emptied before a consecutive said milking session, and wherein an under-pressure in relation to atmospheric pressure prevails in the receiver (120, 120*a*, 120*b*, 120*c*) during the milking session, a plurality of milk evacuation tubes (140*a*, 140*b*, 140*c*, 140*d*), wherein each one of the teat cups (150*a*, 150*b*, 150*c*, 150*d*) is connected to the receiver (120, 120*a*, 120*b*, 120*c*) via a respective one of the milk evacuation tubes (140a, 140b, 140c, 140d), a vacuum regulator (130*a*1, 130*a*2, 130*a*3, 130*a*4) configured to set an under-pressure prevailing in the receiver (120, 120*a*, 120*b*, 120*c*) to a first level of under-pressure at a commencement of the milking session, and increase the under-pressure prevailing in the receiver (120, 120*a*, 120*b*, 120*c*) during the milking session from the first level of under-pressure to a second level of under-pressure, a measuring instrument (170) arranged to measure a measurement indicative of the mass flow rate of milk extracted from the teats of the animal at said one milking point during the milking session, a controller (160) is communicatively connected to the measuring instrument (170) and also communicatively connected to the vacuum regulator (130*a*1, 130*a*2, 130*a*3, 130*a*4), wherein the controller (160) is configured to, repeatedly during the milking session:

obtain a measurement from the measuring instrument (170);

compare the obtained measurement with a threshold limit, and based on the comparison between the obtained measurement and the threshold limit, generate and provide a control signal to the vacuum regulator (130*a*1, 130*a*2, 130*a*3, 130*a*4) to switch the under-pressure level prevailing in the receiver (120, 120*a*, 120*b*, 120*c*) from the first level of under-pressure to the second level of under-pressure, by at least one of:

the vacuum regulator (130*a*1, 130*a*2, 130*a*3, 130*a*4) operating an actuator (620) configured to selectively reduce or increase a size of an adjustable passage (610) of the pipe (115), the adjustable passage (610) being located between the vacuum pump (110) and the receiver (120, 120*a*, 120*b*, 120*c*), whereby the vacuum regulator (130*a*1, 130*a*2, 130*a*3, 130*a*4) switches the under-pressure in the receiver (120, 120*a*, 120*b*, 120*c*) from the first level of under-pressure to the second level 41 under-pressure by moving the actuator (620) to selectively reduce or increase the size of the adjustable passage (610) of the pipe (115), and the vacuum regulator (130*a*1, 130*a*2, 130*a*3, 130*a*4) repeatedly and alternatingly opening and closing an air inlet (125) of atmospheric pressure at a first frequency when the first level of under-pressure is desired in the receiver (120, 120*a*, 120*b*, 120*c*) and at a second frequency when the second level of under-pressure is desired in the receiver (120, 120*a*, 120*b*, 120*c*), wherein the air inlet of each milking point is configured so that the receiver is exposed to an atmosphere in which the milking system is arranged only where the air inlet is open.

2. The milking system (100) according to claim 1, wherein the measuring instrument (170) of each milking point comprises a timer, arranged to be started at a starting point in time, said starting point being related to the commencement of the milking session; wherein the threshold limit comprises a time threshold limit.

3. The milking system (100) according to claim 1, wherein the measuring instrument (170) of each milking point is arranged to measure a weight of liquid accumulated in the receiver (120, 120*a*, 120*b*, 120*c*) during the milking session, from the commencement of the milking session;

and wherein the threshold limit comprises a threshold weight limit.

4. The milking system (100) according to claim 1, wherein the measuring instrument (170) of each milking point is arranged to measure a volume of liquid accumulated in the receiver (120, 120*a*, 120*b*, 120*c*) (120) during the milking session, from the commencement of the milking session;

and wherein the threshold limit comprises a threshold volume limit.

5. The milking system (100) according to claim 1, wherein the measuring instrument (170) of each milking point is arranged to measure any one of:

a mass flow rate of liquid flowing into the receiver (120, 120*a*, 120*b*, 120*c*) during the milking session, a difference in weight per time unit of liquid accumulated in the receiver (120, 120*a*, 120*b*, 120*c*), and a difference in volume per time unit of liquid accumulated in the receiver (120, 120*a*, 120*b*, 120*c*); and wherein the threshold limit comprises a threshold mass flow rate limit.

6. The milking system (100) according to claim 1, wherein the measuring instrument (170) comprises a plurality of sensors (170*a*, 170*b*, 170*c*, 170*d*), wherein each of the plurality of sensors (170*a*, 170*b*, 170*c*, 170*d*) is arranged in a respective one of the milk evacuation tubes (140*a*, 140*b*, 140*c*, 140*d*) and configured to measure the mass flow rate of liquid passing a section of the respective milk evacuation tube (140a, 140b, 140c, 140d) between the teat cup (150*a*, 150*b*, 150*c*, 150*d*) and the receiver (120, 120*a*, 120*b*, 120*c*) during the milking session; and wherein the threshold limit comprises a threshold mass flow rate per teat limit.

7. The milking system (100) according to claim 6, comprising a plurality of valve devices (180*a*, 180*b*, 180*d*) wherein each of the plurality of valve devices (180*a*, 180*b*, 180*c*, 180*d*) is arranged in a respective one of the plurality of milk evacuation tubes (140*a*, 140*b*, 140*c*, 140*d*), to reduce or increase under-pressure upstream of the valve device (180*a*, 180*b*, 180*c*, 180*d*), in the milk flow direction, during the milking session by reducing or increasing an adjustable passage of the respective valve device (180*a*, 180*b*, 180*c*, 180*d*), from a first position at a beginning of the milking session; and wherein the controller (160) is communicatively connected to each one of the valve devices (180*a*, 180*b*, 180*c*, 180*d*), and configured to obtain a measurement from each of the sensors (170*a*, 170*b*, 170*c*, 170*d*);

compare each one of the obtained measurements with the threshold limit; and, when the obtained measurement from a given one of the sensors (170*a*, 170*b*, 170*c*, 170*d*) exceeds the threshold limit:

generate and provide a control signal to the valve device (180*a*, 180*b*, 180*c*, 180*d*) of the milk evacuation tube (140*a*, 140*b*, 140*c*, 140*d*) of the given sensor (170*a*, 170*b*, 170*c*, 170*d*), to reduce, or increase, the respective adjustable passage, thereby decreasing, or increasing, the under-pressure upstream the valve device (180*a*, 180*b*, 180*c*, 180*d*) associated with the given sensor.

8. The milking system (100) according to claim 6, wherein the controller (160) is configured to:

obtain a measurement from each of the sensors (170*a*, 170*b*, 170*c*, 170*d*);

compare each one of the obtained measurements with the threshold limit; and generate and provide a control signal to the vacuum regulator (130*a*, 130*b*, 130*c*), to switch the under-pressure level prevailing in the receiver (120, 120*a*, 120*b*, 120*c*) from the first level of under-pressure to the second level of under-pressure, when obtained measurements of all of the sensors (170*a*, 170*b*, 170*c*, 170*d*) exceeds the threshold limit.

9. The milking system (100) according to claim 6, comprising a plurality of valve devices (180*a*, 180*b*, 180*c*, 180*d*) wherein each of the plurality of valve devices (180*a*, 180*b*, 180*c*, 180*d*) is arranged in a respective one of the milk evacuation tubes (140*a*, 140*b*, 140*c*, 140*d*) and configured to reduce or increase under-pressure upstream of the valve device (180*a*, 180*b*, 180*c*, 180*d*), in the milk flow direction, during the milking session by reducing or increasing an adjustable passage of the respective valve device (180*a*, 180*b*, 180*c*, 180*d*), from a first position at a beginning of the milking session; and wherein the controller (160) is communicatively connected to each one of the valve devices (180*a*, 180*b*, 180*c*, 180*d*), and configured to:

obtain a measurement from each of the sensors (170*a*, 170*b*, 170*c*, 170*d*);

compare each one of the obtained measurements with the threshold limit;

generate and provide a control signal to the vacuum regulator (130*a*, 130*b*, 130*c*), to switch the under-pressure level prevailing in the receiver (120, 120*a*, 120*b*, 120*c*) from the first level of under-pressure to the second level of under-pressure, when obtained measurements of at least one of the sensors (170*a*, 170*b*, 170*c*, 170*d*) exceeds the threshold limit; and generate and provide a control signal to the valve devices (180*a*, 180*b*, 180*c*, 180*d*) of the milk evacuation tube (140*a*, 140*b*, 140*c*, 140*d*) for which sensor measurements exceeding the threshold limit have not been obtained, to reduce, or increase, the respective adjustable passage, thereby decreasing, or increasing, the under-pressure upstream the valve device (180*a*, 180*b*, 180*c*, 180*d*).

10. The milking system (100) according to claim 1, wherein, each of the plural milking points further comprise air tubes (175*a*, 175*b*, 175*c*, 175*d*), each respective one of the air tubes (175*a*, 175*b*, 175*c*, 175*d*) arranged to supply air into a corresponding one of the milk evacuation tubes (140*a*, 140*b*, 140*c*, 140*d*) during the milking session, wherein the threshold limit comprises a threshold under-pressure level limit, wherein the measuring instrument (170) comprises a plurality of sensors (170*a*, 170*b*, 170*c*, 170*d*), each of the plurality of sensors (170*a*, 170*b*, 170*c*, 170*d*) being arranged in a respective one of the air tubes (175*a*, 175*b*, 175*c*, 175*d*) of the milk evacuation tubes (140*a*, 140*b*, 140*c*, 140*d*) and configured to measure under-pressure level in the respective air tube (175*a*, 175*b*, 175*c*, 175*d*), and wherein the respective one air tube (175*a*, 175*b*, 175*c*, 175*d*) is arranged to supply air into a corresponding said milk evacuation tube (140*a*, 140*b*, 140*c*, 140*d*) during the milking session.

11. The milking system (100) according to claim 1, wherein each milking point further comprises the adjustable passage (610) of the pipe (115) between the vacuum pump (110) and the receiver (120), the actuator (620) configured to selectively reduce or increase the size of the adjustable passage (610), and wherein in each milking point the vacuum regulator is connected to the actuator and configured to switch the under-pressure in the receiver from the first level of under-pressure to the second level of under-pressure by moving the actuator to alter the size of the adjustable passage (610).

12. The milking system of claim 1, wherein in each milking point the receiver further comprises the air inlet configured so that an interior of the pipe is exposed to an atmosphere in which the milking system is arranged only when the air inlet is open, the vacuum regulator being operably connected to the air inlet so as to control whether the air inlet is open or closed, and wherein the vacuum regulator is configured to:

repeatedly and alternatingly open and close the air inlet at the first frequency to set the receiver to the first level of under-pressure, and repeatedly and alternatingly open and close the air inlet at the second frequency to set the receiver to the second level of under-pressure.

13. The milking system (100) according to claim 1, further comprising a ring line (199) that connects the vacuum pump (110), via the pipe (115), to the vacuum regulator (130*a*1, 130*a*2, 130*a*3, 130*a*4) of each of the milking points.

14. The milking system (100) according to claim 10, further comprising a ring line (199) that connects the vacuum pump (110), via the pipe (115), to the vacuum regulator (130*a*1, 130*a*2, 130*a*3, 130*a*4) of each of the milking points.

* * * * *